(12) United States Patent
Nishimori et al.

(10) Patent No.: US 7,931,802 B2
(45) Date of Patent: Apr. 26, 2011

(54) WATER TREATMENT SYSTEM

(75) Inventors: Kazuhisa Nishimori, Amagasaki (JP); Kiyoshi Izumi, Amagasaki (JP); Taichi Uesaka, Amagasaki (JP); Tatsuya Uejima, Amagasaki (JP); Hidetoshi Masutani, Yao (JP); Shigeto Miuma, Yao (JP)

(73) Assignee: Kubota Corporation (JP)

( * ) Notice: Subject to any disclaimer, the term of this patent is extended or adjusted under 35 U.S.C. 154(b) by 923 days.

(21) Appl. No.: 11/884,377

(22) PCT Filed: Feb. 27, 2006

(86) PCT No.: PCT/JP2006/303549
§ 371 (c)(1),
(2), (4) Date: Aug. 15, 2007

(87) PCT Pub. No.: WO2006/093070
PCT Pub. Date: Sep. 8, 2006

(65) Prior Publication Data
US 2009/0236275 A1 Sep. 24, 2009

(30) Foreign Application Priority Data
Feb. 28, 2005 (JP) .................. 2005-052174

(51) Int. Cl.
*B01J 20/00* (2006.01)
(52) U.S. Cl. .................. 210/201; 210/205; 210/295
(58) Field of Classification Search .................. 210/201, 210/205, 295
See application file for complete search history.

(56) References Cited

FOREIGN PATENT DOCUMENTS

| JP | 10-156380 | 6/1998 |
|---|---|---|
| JP | 2000-300968 | 10/2000 |
| JP | 2003-071485 | 3/2003 |
| JP | 2003-170185 | 6/2003 |
| JP | 2004-255268 | 9/2004 |
| JP | 2004-313923 | 11/2004 |

*Primary Examiner* — Chester T Barry
(74) *Attorney, Agent, or Firm* — Kusner & Jaffe (57) ABSTRACT

A water treatment system having a biological treatment step (a secondary treatment step) and a membrane separation step (a tertiary treatment step), wherein a portion of the raw water to be treated and/or a portion of the primarily treated water in the pretreatment step are biologically treated and supplied into a reaction tank in the membrane separation step as the main channel system, while the remainder the raw water to be treated and/or the remainder of the primarily treated water in the pretreatment step are added together with a flocculating agent to the reaction tank in the membrane separation step, and then the membrane separation is conducted in the membrane separation step.

7 Claims, 4 Drawing Sheets

PRIOR ART

FIG. 7
PRIOR ART

WATER TREATMENT SYSTEM

FIELD OF THE INVENTION

The present invention relates to a water treatment system and to a technique for carrying out an advanced treatment on wastewater using a membrane separation apparatus.

BACKGROUND OF THE INVENTION

Japanese Patent Laid-Open No. 2004-840 describes a conventional water treatment technique.

Figure 6:
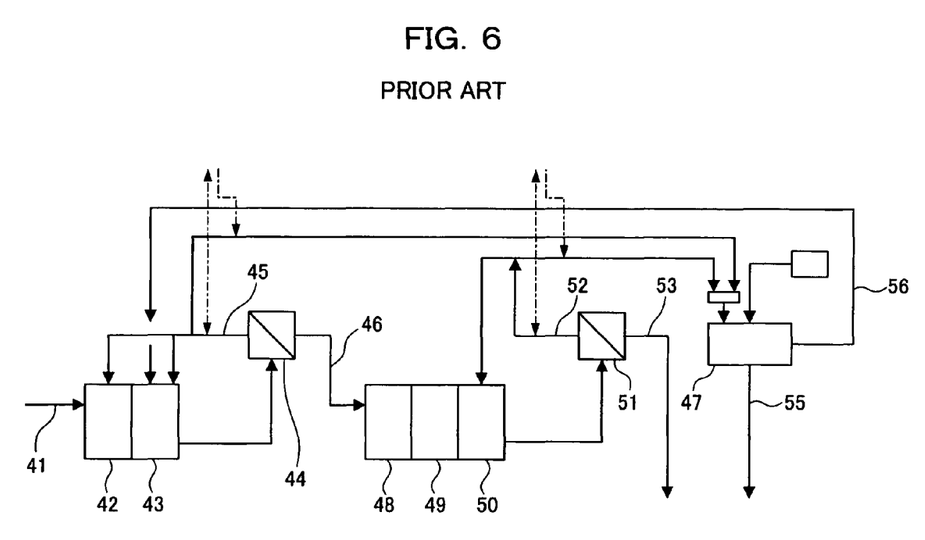
FIG. 6 is a flow sheet showing a conventional water treatment system.

Referring to FIG. 6 of Japanese Patent Laid-Open No. 2004-840, sludge and excrement 41 from water treatment tanks are guided to an aeration tank 42, where a biological treatment is carried out on the sludge and excrement 41 using microorganisms. The biologically treated water is fed via a biological treatment tank 43 to a first membrane separation apparatus 44, which separates the sludge and excrement into concentrated sludge 45 and membrane separated water 46.

The concentrated sludge 45 is partly returned to the aeration tank 42 and the biological treatment tank 43 as sludge to be returned. The rest of concentrated sludge is continuously or intermittently fed to a dehydrator 47. On the other hand, the membrane separated water 46 is mixed with a flocculation agent in a mixture tank 48. The mixture is then guided to a flocculation tank 49, in which flocs are formed. The resulting water is then guided to a flocculation membrane raw water tank 50 and then to a second membrane separation apparatus 51. In the second membrane separation apparatus 51, the water is separated into flocculated concentrated sludge 52 and membrane separated water 53 with a flocculation system.

The membrane separated water 53 with a flocculation system is guided out of the system, and the flocculated concentrated sludge 52 is partly returned to the flocculation membrane raw water tank 50, with the remaining sludge continuously supplied to the dehydrator 47 as sludge slurry together with the rest of concentrated sludge 45. The dehydrated sludge 55 is guided out of the system, and a dehydrated separated liquid 56 separated from the sludge is continuously returned to the biological treatment water tank 43.

Another conventional technique is disclosed in Japanese Patent Laid-Open No. 2003-236584. The technique will be described with reference to FIG. 7.

Figure 7:
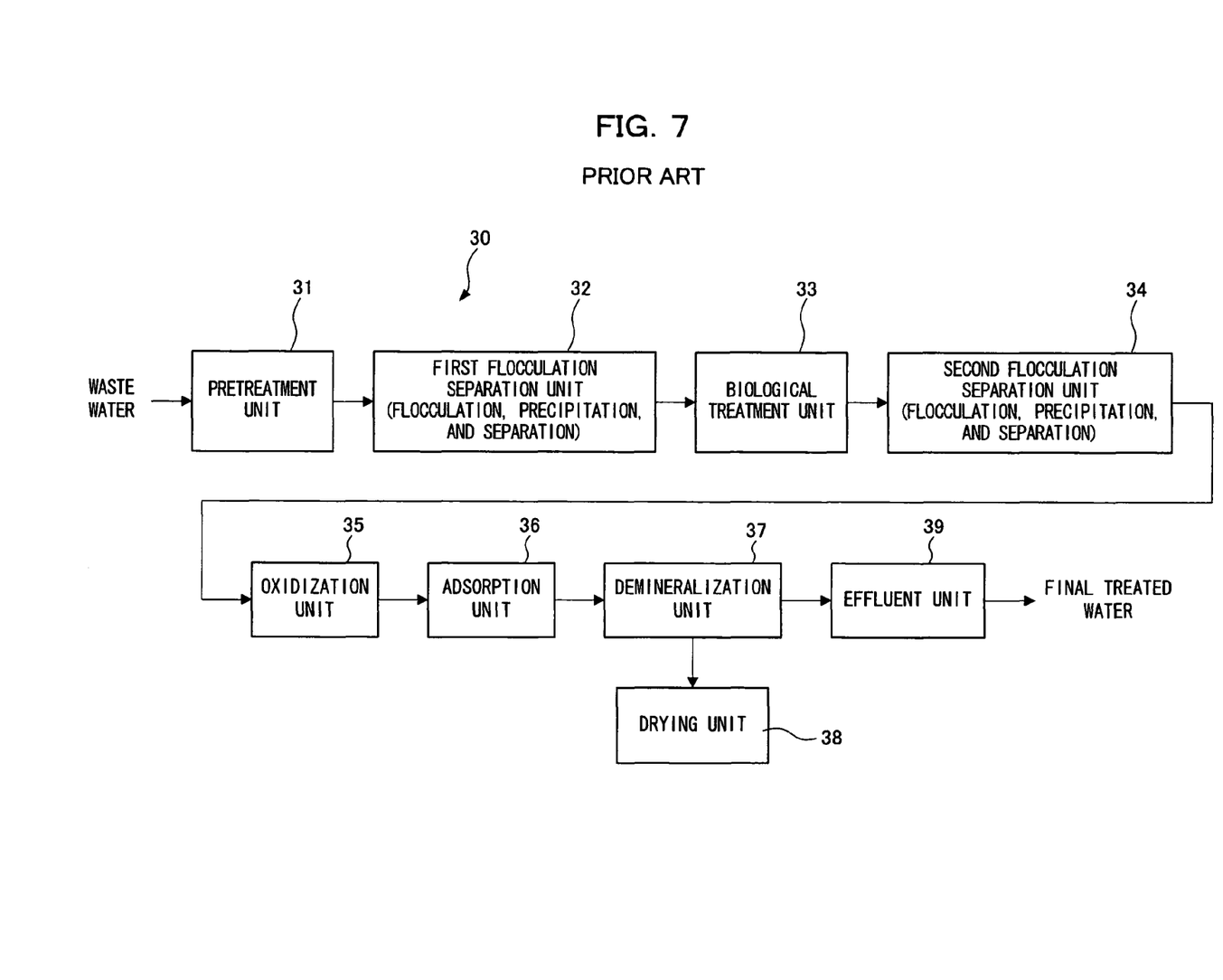
FIG. 7 is a block diagram showing the conventional water treatment system.

A sewage treatment apparatus 30 comprises a pretreatment facility 31, a first flocculation separation facility 32, a biological treatment facility 33, a second flocculation separation facility 34, an oxidization facility 35, an adsorption facility 36, a demineralization facility 37, a drying facility 38, and an effluent facility 39.

The pretreatment facility 31 carries out a pretreatment such as adjustment and homogenization of the amount and quality of sewage. The first flocculation separation facility 32 carries out a flocculation precipitation separation treatment and is located downstream of and adjacent to the pretreatment facility 31. The biological treatment facility 33 carries out a biological treatment and is located downstream of and adjacent to the first flocculation separation facility 32. The second flocculation separation facility 34 carries out a flocculation membrane separation treatment and is located downstream of and adjacent to the biological treatment facility 33.

The oxidization facility 35 carries out an advanced oxidization treatment and is located downstream of and adjacent to the second flocculation separation facility 34. The adsorption facility 36 carries out a suction treatment and is located downstream of and adjacent to the oxidization facility 35. The demineralization facility 37 carries out a demineralization treatment and is located downstream of and adjacent to the adsorption facility 36.

The drying facility 38 takes out solid salt and is located downstream of and adjacent to the demineralization facility 37. The effluent facility 39 releases the final treated water to a public water area and is located downstream of and adjacent to the demineralization facility 37.

As described above, in Japanese Patent Laid-Open No. 2004-840, the biologically treated water biologically treated in the aeration tank 42 is subjected to membrane separation at multiple levels by the first membrane separation apparatus 44 and the second membrane separation apparatus 51. In particular, in the second membrane separation apparatus 51, the flocculation agent is used together for flocculation membrane separation.

Japanese Patent Laid-Open No. 2003-236584 achieves an advanced treatment by carrying out the flocculation, precipitation, and separation treatment in the first flocculation separation facility 32, the biological treatment in the biological treatment facility 33, and the membrane filtration separation treatment with a flocculation agent in the second flocculation separation facility 34.

However, the BOD concentration of the biologically treated water is not constant but varies depending on the BOD concentration of raw water that has not been biologically treated. Thus, when an advanced treatment is carried out in a reaction tank with a membrane separation apparatus placed therein, using a flocculation agent together, the following problems may occur.

The low BOD concentration (for example, less than 20 mg/L) of the biologically treated water reduces the amount of sludge generated in the reaction tank (the amount of microorganisms) and thus the concentration of organic substances in the reaction tank decreases. Thus, even with the addition of the flocculation agent, smaller sludge flocs are formed in the reaction tank, and said sludge flocs are likely to be dispersed easily, so that the amount of flocculation agent might be increased.

An environment with a lower inflowing BOD concentration causes the exhaustion of extracellular substrates of the microorganisms in the reaction tank. The microorganisms thus start to use intracellular carbon sources (endogenous substrates), causing the self-degradation of microorganisms contained in the sludge flocs, which are thus dispersed in the form of fragments. Thus, the dispersed very small fragments of the sludge and microorganisms self-degrade into small solid substance of the microorganisms. This makes a membrane surface in the membrane separation apparatus likely to be occluded.

When a submerged membrane separation tank with a flocculation system is used for the advanced treatment, a certain range of sludge concentration is suitable for operation. This sludge concentration range is required to ensure sufficient treatment performance or to form sludge flocs of a preferred size. However, a low inflowing BOD concentration requires a long time to reach the sludge concentration suitable for operation or makes it difficult to reach that concentration.

The present invention overcomes these and other problems, and provides a water treatment system using a membrane separation apparatus to treat biologically treated water, the system making it possible to inhibit fouling of membrane surfaces and to reduce the amount of flocculation agent used.

SUMMARY OF THE INVENTION

To solve the problems described above, the present invention provides a water treatment system in which raw water to be treated flowing into the system flows into a reaction tank for a membrane separation process via a biological treatment process and in which in the membrane separation process, a flocculation agent is used together to carry out a membrane separation treatment, the system comprising a raw water supply unit that supplies the treatment target raw water to the reaction tank and a flocculation agent addition unit that adds the flocculation agent to the reaction tank.

With the above configuration, when an activated sludge method with a membrane separation is applied to an advanced treatment, if the BOD concentration of the water flowing into the reaction tank for the membrane separation process is low (for example, less than 20 mg/L), resulting in a very small amount of generated sludge, the raw water supply unit supplies the reaction tank with an appropriate amount of treatment target raw water not subjected to the biological treatment process. Further, the flocculation agent addition unit adds the flocculation agent to the reaction tank.

The addition of the treatment target raw water increases the amount of organic components and SS to adjustably make the nature of the membrane separation target liquid in the reaction tank suitable for floc formation. The flocculation agent is then used to flocculate the organic components (dissolvable substances) and SS (solid substances) to form sludge flocs of a sufficient size.

By thus adjustably setting the concentration of the sludge in the reaction tank at a suitable value for floc formation to increase the diameter of sludge flocs, it is possible to reduce the fouling of membrane surfaces and to improve a filtration property. This makes it possible to suitably treat the treated water in the biological treatment process and to reduce the amount of added flocculation agent.

A desirable flocculation agent is an organic polymer flocculation agent which is unlikely to be degraded under disturbance conditions and which is unlikely to biological decomposition.

The flocculation agent may be independently added to the reaction tank or may be mixed with the treatment target raw water and then supplied to the reaction tank together with the treatment target raw water. The flocculation agent is added to the water, with the ratio of the amount of added flocculation agent to the amount of introduced treatment target raw water, set at a given value.

The ratio of the amount of added flocculation agent to the amount of sludge generated in the reaction tank or the amount of reduction in sludge needs to be set at a given value (the amount of flocculation agent per sludge concentration). This addition ratio enables the amount of added flocculation agent to be optimized. Alternatively, the amount of flocculation agent contained in excess sludge discharged from the reaction tank may be measured, and the shortage of the flocculation agent may be determined from the measurement on the basis of the rule of thumb. In this case, the determined shortage could be the amount of flocculation agent to be replenished.

This allows the flocculation agent to be added more easily than the conventional technique, that is, the technique of measuring the dissoluble COD concentration in the reaction tank, the COD concentration of outflowing water flowing out of the reaction tank, and turbidity and adding the flocculation agent so as to adjust these measurements to appropriate values. The membrane separation treatment during the membrane separation process may be carried out by immersing the membrane separation unit in the reaction tank or placing the membrane separation unit outside the reaction tank.

The present invention provides a water treatment system in which raw water to be treated flowing into the system is sequentially subjected to a pretreatment process and a biological treatment process and then flows into a reaction tank for a membrane separation process and in which in the membrane separation process, a flocculation agent is used in combination to carry out a membrane separation treatment, the system comprising a treated water supply unit that supplies the treated water in the pretreatment process to the reaction tank and a flocculation agent addition unit that adds the flocculation agent to the reaction tank.

With the above configuration, when an activated sludge method with a membrane separation is applied to an advanced treatment, if the BOD concentration of the water flowing into the reaction tank for the membrane separation process is low (for example, less than 20 mg/L), resulting in a very small amount of generated sludge, the treated water supply unit supplies the reaction tank with an appropriate amount of treated water in the pretreatment process not subjected to the biological treatment process. Further, the flocculation agent addition unit adds the flocculation agent to the water.

The addition of the treated water in the pretreatment process increases the amount of organic components and SSs to adjustably make the nature of the membrane separation target liquid in the reaction tank suitable for floc formation. The flocculation agent is then used to flocculate the organic components (dissoluble substances) and SSs (solid substances) to form sludge flocs of a sufficient size.

By thus adjustably setting the concentration of the sludge in the reaction tank at a suitable value for floc formation to increase the diameter of sludge flocs, it is possible to reduce the fouling of membrane surfaces and to improve the filtration property. This makes it possible to suitably treat the treated water in the biological treatment process and to reduce the amount of added flocculation agent.

The flocculation agent may be independently added to the reaction tank or may be mixed with the treated water in the pretreatment process and then supplied to the reaction tank together with the treated water. The flocculation agent is added to the water, with the ratio of the amount of added flocculation agent to the amount of introduced treated water, set at a given value.

The ratio of the amount of added flocculation agent to the amount of sludge generated in the reaction tank or the amount of reduction in sludge needs to be set at a given value (the amount of flocculation agent per sludge concentration). This addition ratio enables the amount of added flocculation agent to be optimized. Alternatively, the amount of flocculation agent contained in excess sludge discharged from the reaction tank may be measured, and the shortage of the flocculation agent may be determined from the measurement on the basis of the rule of thumb. In this case, the determined shortage could be the amount of flocculation agent to be replenished.

In the water treatment system in accordance with the present invention, the pretreatment process comprises a solid-liquid separation treatment process or a dissolution treatment process.

In the above configuration, the solid-liquid separation treatment process may use a screen or a method such as precipitation separation, filtration separation, or flocculation separation using a flocculation agent is applicable. The dissolution treatment process cruses excrement residues and physico-chemically dissolves SSs.

The water treatment system in accordance with the present invention has, between the biological treatment process and the membrane separation process, a precipitation treatment unit that carries out a precipitation treatment on outflowing water in a biological treatment tank constituting the biological treatment process and supplies separated water to the reaction tank for the membrane separation process, and a mixture supply unit that directly supplies the outflowing water in the biological treatment tank to the reaction tank for the membrane separation process without passing the outflowing water through the precipitation treatment unit.

With the above configuration, the separated water having passed through the precipitation treatment unit is introduced into the reaction tank for the membrane separation process and the reaction tank is supplied with an appropriate amount of outflowing water in the biological treatment tank which has not passed through the precipitation treatment unit. This allows the concentration of the sludge in the reaction tank to be adjusted to control the amount of added flocculation agent. In this case, the reaction tank may be supplied only with the separated water having passed through the precipitation treatment unit.

The present invention provides a water treatment system comprising a submerged membrane separation apparatus in the reaction tank for the membrane separation process, the submerged membrane separation apparatus comprising a membrane separation unit, an air diffuser located below the membrane separation unit, and a control unit that controls the amount of aeration in the air diffuser, the control unit controlling the amount of aeration in the air diffuser using as a control indicator at least one of a trans-membrane pressure in the membrane separation unit, the amount of load flowing into the reaction tank, the level of the water in the reaction tank, and the amount of membrane permeation liquid flowing out through the membrane separation unit.

Thus, according to the present invention, when in the membrane separation process, the membrane separation treatment is carried out on the outflowing water from the biological treatment tank constituting the biological treatment process, the treatment target raw water or the treated water in the pretreatment process is supplied together with the flocculation agent. This makes it possible to inhibit the fouling of membrane surfaces in the membrane separation unit to reduce the amount of flocculation agent used.

DETAILED DESCRIPTION OF PREFERRED EMBODIMENTS

Embodiments of the present invention will be described below with reference to the drawings.

Embodiment 1

Figure 1:
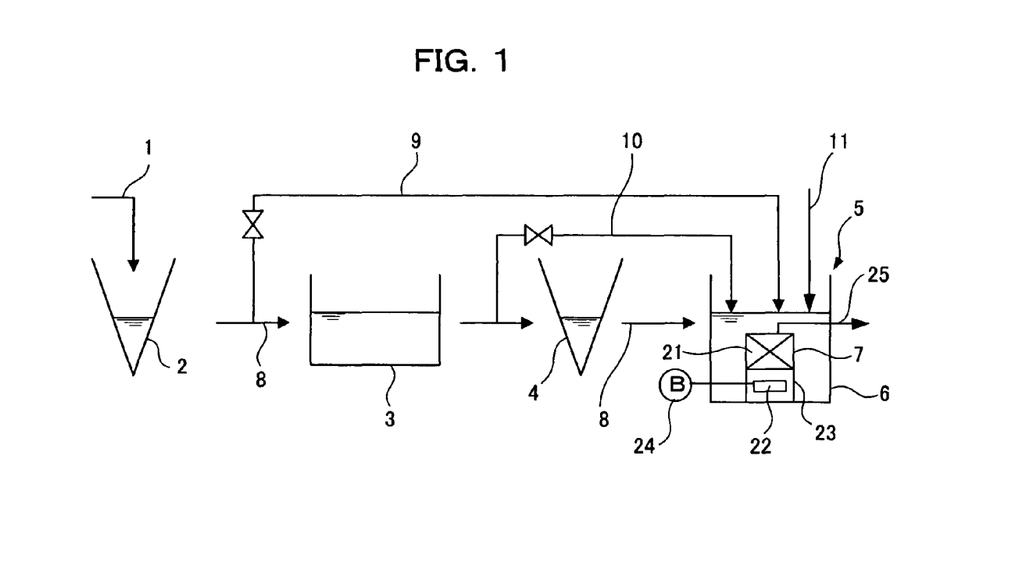
FIG. 1 is a flow sheet showing a water treatment system in accordance with Embodiment 1 of the present invention.
Figure 2:
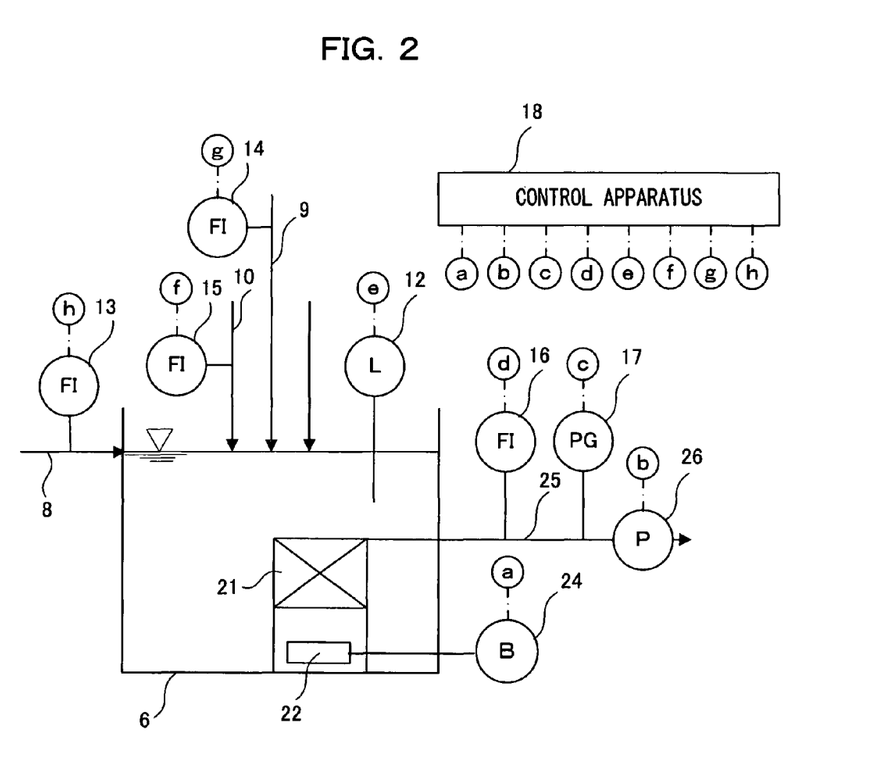
FIG. 2 is a schematic diagram showing a submerged membrane separation tank with a flocculation system in accordance with Embodiment 1.

In FIGS. 1 and 2, a water treatment system has a primary treatment process comprising a first precipitation tank 2 for a pretreatment process, a secondary treatment process comprising a biological treatment tank 3 for a biological treatment process and a precipitation tank 4 for a precipitation treatment unit, and a tertiary treatment process comprising a submerged membrane separation tank 5 with a flocculation system for a membrane separation process.

The first precipitation tank 2 carries out a solid-liquid separation treatment on treatment target raw water 1 flowing into the system. The biological treatment tank 3 biologically treats primarily treated water flowing out of the first precipitation tank 2. The precipitation tank 4 carries out a solid-liquid separation treatment on outflowing water flowing out of the biological treatment tank 3. The submerged membrane separation tank 5 with a flocculation system biologically treats separated water that is secondarily treated water flowing out of the precipitation tank 4.

Although Embodiment 1 has the precipitation tank 4, outflowing water from the biological treatment tank 3 may be supplied directly to the submerged membrane separation tank 5 with a flocculation system for a biological treatment. The submerged membrane separation tank 5 with a flocculation system has a submerged membrane separation apparatus 7 immersed in a reaction tank 6. However, a membrane separation apparatus may be located outside the reaction tank 6. The water treatment system in accordance with Embodiment 1 is basically continuously operated but may be operated so as to carry out a batch treatment in each of the tanks.

The water treatment system has a main channel line 8 that sequentially connects the first precipitation tank 2, the biological treatment tank 3, the precipitation tank 4, and the submerged membrane separation tank 5 with a flocculation system. Besides the main channel 8, the system has a primarily treated water supply line 9 constituting a treated water supply unit that supplies primarily treated water to the reaction tank 6 and a mixture supply line 10 that supplies outflowing water from the biological treatment tank 3 directly to the reaction tank 6 without passing the water through the precipitation tank 4.

The submerged membrane separation tank 5 with a flocculation system has a flocculation agent supply line 11 constituting flocculation agent addition unit for supplying a flocculation agent to the reaction tank 6. The flocculation agent supply line 11 can be provided being connected to the middle of a raw water supply line 9.

Although not disclosed in the drawings, the biological treatment tank 3 has an aeration apparatus. Each of the main channel 8, the primarily treated water supply line 9, and the mixture supply line 10 appropriately has a pump and a valve apparatus.

The submerged membrane separation apparatus 7 comprises a plurality of plate-like membrane cartridges 21 and an air diffuser 22 that ejects a membrane surface cleaning gas from the bottom thereof being located inside a case 23. A blower 24 is located outside the tank to supply air to the air diffuser 22. Each of the membrane cartridges 21 is in communication with a permeation water guide-out pipe 25 via a water collection pipe (not shown).

The submerged membrane separation apparatus 7 aerates an activated sludge mixture in the tank using air ejected by the air diffuser 22 and allows aeration air to act on the membrane surface of the membrane cartridges 21 as membrane surface cleaning air.

In the aerating state, the submerged membrane separation apparatus 7 allows a suction pump 26 to apply driving pressure to the membrane cartridges 21, which thus filters the activated sludge mixture in the tank. The permeation water having permeated through the membrane cartridges 21 is guided out of the tank through the permeation water guide-out pipe 25 as treated water. The membrane cartridge 21 can be used for gravity filtration using a water head in the tank as driving pressure.

The aerated air ejected from the air diffuser 22 causes a rising flow of the mixture in the tank. The rising flow comprising bubbles of the aerated air and the mixture in the tank washes the membrane surfaces of the membrane cartridges 21. This inhibits a separation function from being degraded to prevent malfunctioning.

In Embodiment 1, the pretreatment process comprises the first precipitation tank 2. However, the technique for the pretreatment may be appropriately selected in accordance with the nature of the treatment target raw water 1. For example, when the treatment target raw water 1 contains large excrement residues, a screen is used to separate the residues into solids and liquids. Removal of the large excrement residues prevents fouling in the membrane cartridges 21 and air diffuser 22 in the submerged membrane separation apparatus 7.

If the excessively high BOD concentration of the treatment target raw water 1 adversely affects the concentration of biologically persistent substances and COD concentration in the treated water in the submerged membrane separation apparatus 7, then precipitation separation, filtration separation, flocculation separation, or the like is carried out to reduce the BOD concentration of the primarily treated water flowing into the biological treatment process. This inhibits an increase in the concentration of MLSS in the reaction tank 6.

If the excessively low BOD concentration of the treatment target raw water 1 prevents the concentration of MLSS in the reaction tank 6 from increasing to a sufficient value, then for example, the biologically persistent substances are made easily degradable by crushing excrement residues by a physical technique, carrying out a chemical reaction-like dissolution treatment using chemicals, or causing oxidation using chemicals. This allows an increase in the BOD concentration of the primarily treated water flowing into the biological treatment process and promote an increase in the concentration of MLSS in the reaction tank 6.

As shown in FIG. 2, in the submerged membrane tank 5 with a flocculation system, the reaction tank 6 has a water gauge 12, and the main channel 8, the primarily treated water supply line 9, and the mixture supply line 10, each connecting to the reaction tank 6, have respective flow meters 13, 14, 15. The permeation water guide-out pipe 25 has a flow meter 16 and a pressure gauge 17. A control apparatus 18 controls the operation of the blower 24 and suction pump 26 on the basis of measurements from the flow meters 13, 14, 15, 16 and the pressure gauge 17.

Figure 3:
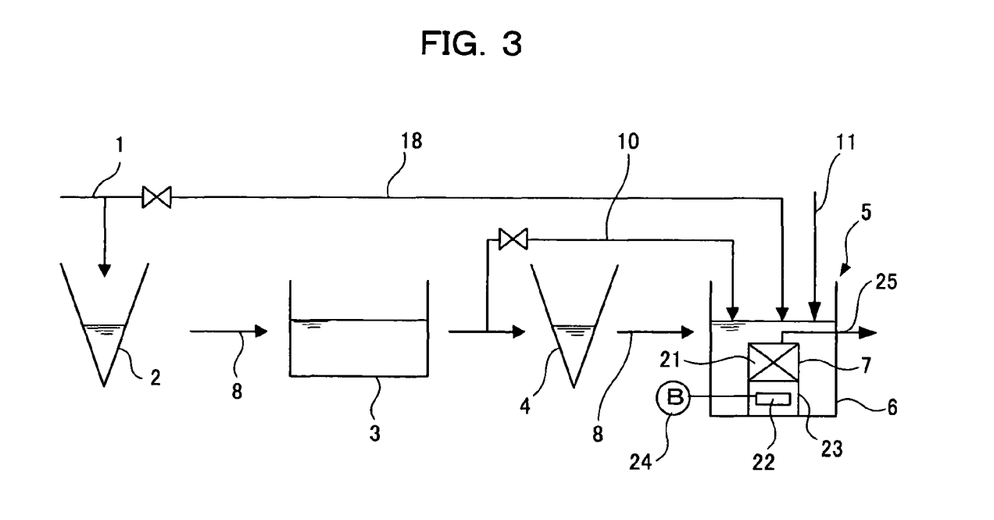
FIG. 3 is a flow sheet showing a water treatment system in accordance with Embodiment 2 of the present invention.
Figure 4:
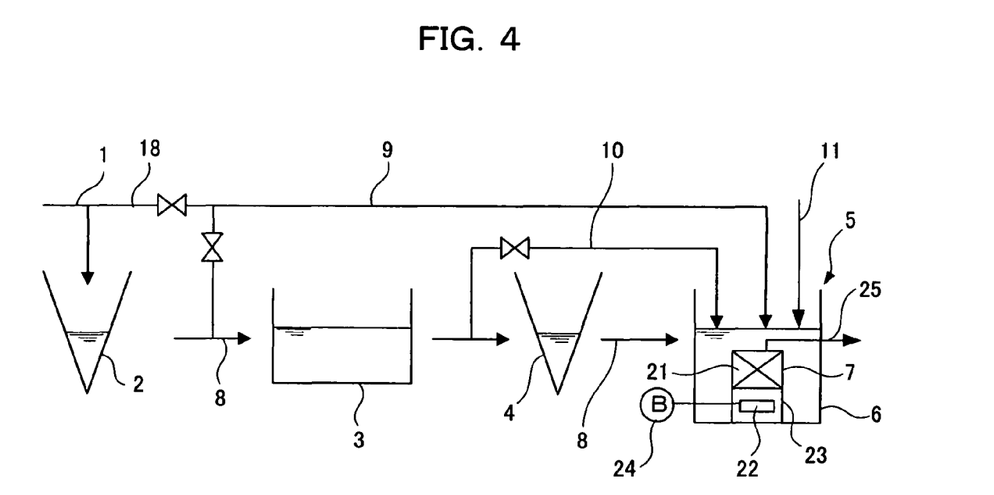
FIG. 4 is a flow sheet showing a water treatment system in accordance with Embodiment 3 of the present invention.

Embodiment 1 has the primarily treated water supply line 9. However, as shown in FIG. 3, in Embodiment 2 of the present invention, a raw water supply line 18 may be provided which serves as a raw water supply unit that supplies the treatment target raw water 1 to the reaction tank 6. As shown in FIG. 4, as Embodiment 3, the raw water supply line 18 may be connected to the primarily treated water supply line 9 so as to selectively supply the primarily treated water or the treatment target raw water 1 or their mixture to the reaction tank 6.

The effects of the configuration in accordance with Embodiment 1 will be described below. The basic effects of Embodiments 2 and 3 are the same as those of Embodiment 1 and will not be described below.

The treatment target raw water 1 flowing into the system is treated by sequentially passing through the first precipitation tank 2, the biological treatment tank 3, and the submerged membrane separation tank 5 with a flocculation system.

When the secondarily treated water in the secondary treatment process is treated in the submerged membrane separation tank 5 with a flocculation system, the reduced BOD concentration (for example, less than 20 mg/L) in the reaction tank 6 significantly reduces the amount of sludge generated in the reaction tank 6.

In this case, an appropriate amount of primarily treated water is supplied from the primarily treated water supply line 9 to the reaction tank 6 in the submerged membrane separation tank 5 with a flocculation system. Here, in Embodiment 2, an appropriate amount of treatment target raw water 1 is supplied through the raw water supply line 18. In Embodiment 3, at least either of the primarily treated water or the treatment target raw water 1 is supplied.

The supply of the primarily treated water (or the treatment target raw water 1) adjusts the BOD concentration of the water flowing into the reaction tank 6 to increase the amount of sludge generated in the reaction tank 6. Further, an appropriate amount of flocculation agent is added to the water through the flocculation agent supply line 11.

To adjust the concentration of the sludge in the reaction tank 6, an appropriate amount of outflowing water from the biological treatment tank 3 may be supplied directly to the reaction tank 6 through the mixture supply line 10 without passing the water through the precipitation tank 4. The amount of the flocculation agent to be added can be inhibited by this adjustment of the sludge concentration. In this case, all the secondarily treated water to be introduced into the reaction tank 6 may be used as outflowing water from the biological treatment tank 3 which does not flow through the precipitation tank 4.

As described above, the primarily treated water and the flocculation agent are added to the target water to increase the amount of organic components and SSs in the reaction tank 6. The nature of the mixture (membrane separation target liquid) in the reaction tank 6 is adjusted so that the concentration of the sludge is suitable for floc formation. The flocculation agent is further used to flocculate the organic components (dissoluble substances) and SSs (solid substances) to form sludge flocs of a sufficiently large size.

By thus adjustably making the concentration of the sludge in the reaction tank 6 suitable for floc formation to increase the diameter of sludge flocs, it is possible to reduce the fouling of the membrane surfaces and to improve the filtration property. This enables the treated water in the biological treatment process to be suitably treated, allowing a reduction in the amount of added flocculation agent.

In the above configuration, the flocculation agent is independently added to the reaction tank 6. However, the flocculation agent may be added to the treatment target raw water 1 in the raw water supply line 9. In this case, the flocculation agent is added to the water, with the ratio of the amount of added flocculation agent to the amount of introduced treatment target raw water 1, set at a given value. The treatment target raw water 1 premixed with the flocculation agent is thus supplied to the reaction tank 6.

The amount of added flocculation agent can be optimized by setting the ratio of the amount of added flocculation agent to the amount of generated sludge or the amount of reduction in sludge at the given value (the amount of flocculation agent per sludge concentration). Alternatively, the amount of flocculation agent contained in excess sludge discharged from the reaction tank 6 may be measured, and the shortage of the flocculation agent may be determined from the measurement on the basis of the rule of thumb. In this case, the determined shortage could be the amount of flocculation agent to be replenished. The amount of added flocculation agent is determined as follows.

If the concentration of the sludge in the reaction tank 6 increases:

That is, if the amount of sludge increases owing to the BOD derived from the primarily treated water or the concentration of the solids, SSs, contained in the secondarily treated water, the amount E(mg/d) of flocculation agent added per day is determined in accordance with:

$$E = C \times D.$$

Here, it is assumed that the flocculation agent is present adhering to the sludge flocs and that the concentration A(mg/L) of the flocculation agent in the reaction tank 6 is proportional to the concentration B(mg/L) of the sludge. Then, the concentration C=A/B of the flocculation agent per sludge concentration is determined. Then, the amount E(mg/d) of flocculation agent added per day is determined on the basis of the amount D(mg/d) of increase in the amount of sludge in the reaction tank 6 per day.

In the case where the concentration of the sludge in the reaction tank 6 decreases:

That is, if almost all of the secondarily treated water introduced into the reaction tank 6 has passed through the biological treatment tank 3 and the precipitation tank 4 and the amount of the sludge in the reaction tank 6 decreases owing to self-degradation and decreases as extraction of excess sludge, the amount (mg/d) of flocculation agent added per day is determined in accordance with the following equation.

Amount of added flocculation agent=sludge amount decrease rate=sludge concentration decrease rate×reaction tank capacity.

Here, the sludge amount decrease rate in the reaction tank 6=MLSS decrease rate−MLSS increase rate. Dividing both sides of the above equation by the capacity of the reaction tank 6 results in sludge concentration decrease rate=MLSS concentration decrease rate−MLSS concentration increase rate.

The above technique allows the flocculation agent to be added to the water more easily than the conventional technique of measuring the dissoluble COD concentration in the reaction tank 6, the COD concentration and turbidity of outflowing water flowing out of the reaction tank 6, and adding the flocculation agent so that these measurements reach respective appropriate values.

To carry out stirring in the reaction tank 6, either mechanical or pneumatic measures may be adopted. However, the present embodiment uses aeration carried out by the air diffuser 22 in the submerged membrane separation tank 5 with a flocculation system.

Figure 5:
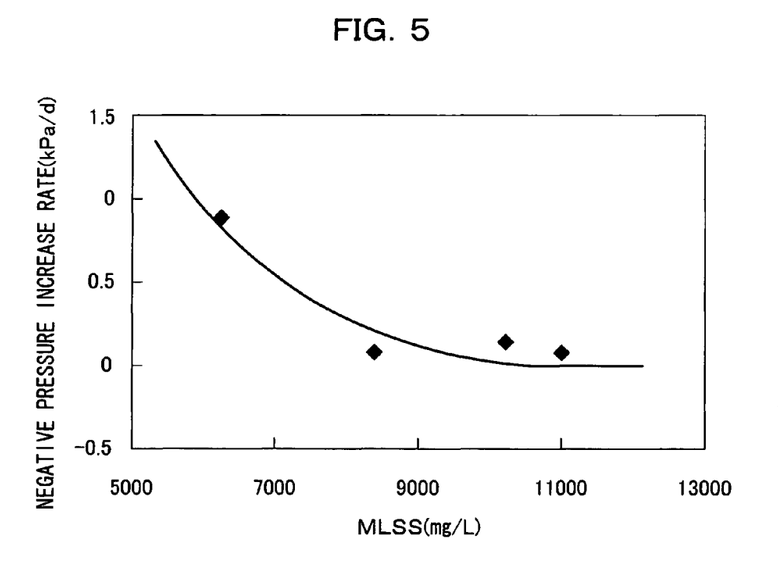
FIG. 5 is a graph showing the relationship between MLSS and negative pressure increase acceleration.

FIG. 5 shows the relationship between negative pressure increase rate (kPa/d) and MLSS concentration (mg/L) in the case where the submerged membrane separation apparatus 7 in the submerged membrane separation tank 5 with a flocculation system is operated in accordance with a suction filtration scheme. The more a value for the negative increase rate is, the more likely the membrane gets fouled.

The figure clearly indicates that a reduced MLSS concentration increases the negative pressure increase rate to make the membrane of the plate-like membrane cartridge 21 more likely to get dirty. The clogging of the membrane can be inhibited by adding the primarily treated water and the flocculation agent to increase the MLSS concentration.

A description will be given with reference to Table 1.

TABLE 1

| | | | |
|---|---|---|---|
| Assumed sludge throughput | m³/d | 100 | |

| | | Raw water quality | Secondarily treated water quality |
|---|---|---|---|
| BOD | mg/L | 200 | |
| T-N | mg/L | 40 | |
| Steady state operation | | | |
| Reaction tank HRT | hr | 2 | |
| Reaction tank capacity | m³ | 8.33 | |
| Yield coefficient | | 0.75 | |
| Killing coefficient | l/d | 0.1 | |
| Apparent yield coefficient | | 0.4 | |
| Assumed MLSS in reaction tank | mg/L | 8000 | |
| BOD removal speed (20° C.) | kg/kgMLSS/d | 0.12 | |

| | | No raw sewage | Raw sewage introduced |
|---|---|---|---|
| Case 1 Reduction in flocculation agent in steady state operation (only BOD regulation) | | | |
| BOD removal speed in reaction tank | kg/d | 8 | 8 |
| Allowable amount of raw sewage to be introduced | m³/d | | 42 |
| Amount of introduced raw sewage | m³/d | 0 | 20 |
| MLSS increase rate | g/d | 750 | 3600 |
| MLSS decrease rate | g/d | 6700 | 6700 |
| Flocculation agent addition requirement | g/d | 5950 | 3100 |
| Flocculation agent reduction amount | | | 2850 |
| Flocculation agent reduction rate | % | | 48 |
| Case 2 Reduction in flocculation agent in steady state operation (T-N regulated, at most 10 mgN/L) | | | |
| BOD removal speed in reaction tank | kg/d | 8 | 8 |
| Allowable amount of raw sewage to be introduced | m³/d | | 42 |
| Amount of introduced raw sewage | m³/d | 0 | 6.25 |
| MLSS increase rate | g/d | 800 | 1600 |
| MLSS decrease rate | g/d | 6700 | 6700 |
| Flocculation agent addition requirement | g/d | 5950 | 5100 |
| Flocculation agent reduction amount | | | 800 |
| Flocculation agent reduction rate | % | | 14 |
| Case 3 Reduction in flocculation agent in steady state operation (T-N regulated, at most 10 mgN/L) Secondarily treated water supplied without passing the outflowing water through precipitation tank | | | |
| BOD removal speed in reaction tank | kg/d | 8 | 8 |
| Allowable amount of raw sewage to be introduced | m³/d | | 42 |
| Amount of introduced raw sewage | m³/d | 0 | 6.25 |
| MLSS increase rate | g/d | 800 | 1600 |
| MLSS decrease rate | g/d | 6700 | 6700 |
| MLSS addition speed with secondarily treated water | g/d | 4200 | 4200 |

TABLE 1-continued

| Flocculation agent addition requirement | g/d | 1700 | 900 |
|---|---|---|---|
| Flocculation agent reduction amount | | | 800 |
| Flocculation agent reduction rate | % | | 47 |

Case 1

This shows the case where the secondarily treated water quality was subjected only to BOD regulation, and 20 m³/d of raw sewage (primarily treated water) was added to the tank; this amount accounts for about 50% of the amount of sewage that can be introduced. The flocculation agent addition requirement was 5,950 g/d when no raw sewage (primarily treated water) was introduced. However, introduction of raw sewage reduced the flocculation agent addition requirement to 3,100 g/d. The flocculation agent addition requirement was reduced by 2,850 g/d, that is, by 48%.

Case 2

The secondarily treated water quality was subjected to BOD and T-N regulations. The amount of introduced raw sewage (primarily treated water) was smaller than that in Case 1; 6.25 m³/d of raw sewage was added to the tank. The flocculation agent addition requirement was 5,900 g/d when no raw sewage was introduced. However, introduction of raw sewage reduced the flocculation agent addition requirement to 5,100 g/d. The flocculation agent addition requirement was reduced by 800 g/d, that is, by 14%.

Case 3

The secondarily treated water quality was subjected to BOD and T-N regulations, 6.25 m³/d of raw sewage (primarily treated water) was added to the tank, and an appropriate amount of outflowing water from the biological treatment tank 3 was supplied directly to the reaction tank 6 for an advanced treatment process through the mixture supply line 10 without passing the outflowing water through the precipitation tank 4. When no raw sewage was introduced and outflowing water from the biological treatment tank 3 was introduced without passing the outflowing water through the precipitation tank 4, the flocculation agent addition requirement was 1,700 g/d. However, the flocculation agent addition requirement was reduced to 900 g/d by introducing both raw sewage and outflowing water from the biological treatment tank 3 not having passed through the precipitation tank 4. The flocculation agent addition requirement was reduced by 800 g/d, that is, by 47%.

The quality of the treatment target raw water 1 is not constant but varies. With variation in water quality, the increase in the amount of sludge in the reaction tank 6 varies. An increase in the amount of sludge leads to increase in the amount of flocculation agent used. Thus, to sufficiently exert the flocculation agent reduction effect in accordance with the present invention, it is necessary to control the increase in the amount of sludge to within an appropriate range in spite of a variation in water quality.

The increase in the amount of sludge can be controlled by varying conditions for mixing the primarily treated water 1 or treatment target raw water 1 with the secondarily treated water, taking into account the quality of the treatment target raw water 1 and the quality of the secondarily treated water in the biological treatment tank 3. However, this is an advanced control that requires much experience.

Further, when the submerged membrane separation apparatus 7 is operated under a load condition where the concentration of MLSS in the reaction tank 6 is low as in the present invention, a variation in the quality of the treatment target raw water 1 sensitively affects the filtration of the mixture in the reaction tank 6. Thus, the amount of generated sludge needs to be controlled in real time depending on the water quality. However, since it is difficult to quickly analyze water quality, real time control is substantially impossible.

For example, if plural types of soft drinks are manufactured on the same line and industrial wastewater is biologically treated, a change in the types of manufactured products significantly varies the quality of the industrial wastewater. This varies the BOD load on the biological treatment tank 3. However, several days are required to have biologically treated activated sludge adapted to a variation in environment. Consequently, much experience is required to stabilize the quality of the secondarily treated water in a short period of time, that is, the inflowing BOD in the reaction tank 6.

Further, in the case where biological treatment efficiency is improved, the BOD concentration of the secondarily treated water decreases to allow the stabilization to be achieved by adjusting the mixture rate of the primarily treated water. However, with reduced biological treatment efficiency, the BOD concentration of the secondarily treated water increases to reduce the amount of water. In this state, to keep the quality and quantity of the permeation water in the submerged membrane separation tank 5 with a flocculation system at respective target values, it is necessary to increase the amount of flocculation agent used.

An explanation will be given of the adverse effect of a variation in the quality of the treatment target raw water 1 on the filtration of the mixture in the tank. With a common biological treatment method, when the relationship between the biomass X(mg/L) in the tank and inflowing BOD C(mg/L) and tank residence time T (day) is such that $0.01 < BOD$ load $C/TX < 0.02$, the quality of treated water is high but active sludge proliferates inappropriately. Furthermore, when $C/TX > 0.1$, the biological treatment is difficult, degrading the quality of treated water.

Also in the present invention, a significant variation in the quality of the treatment target raw water 1 significantly varies the quality of the secondarily treated water in the biological treatment tank 3. That is shown in Table 2 and Table 3.

TABLE 2

| | Raw water | Biologically treated water | Inflowing water into reaction tank |
|---|---|---|---|
| Mixture ratio (raw water:biologically treated water) | | | 1:10 |
| BOD (mg/L) small | 50 | 3 | 7 |
| BOD (mg/L) standard | 150 | 20 | 32 |
| BOD (mg/L) large | 500 | 150 | 182 |

TABLE 3

| Inflowing BOD C (mg/L) | 7 | 32 | 182 |
|---|---|---|---|
| Tank residence time T (day) | 0.25 | 0.25 | 0.25 |
| Tank biomass X (mg/L) | 7000 | 7000 | 7000 |
| BOD load C/TX | 0.004 | 0.02 | 0.1 |

As shown in Table 2, when the BOD of the raw water (treatment target raw water 1) is as low as 50 (mg/L), the BOD of the biologically treated water (secondarily treated water) is 3 (mg/L) and the BOD of the inflowing water to the reaction tank, obtained by mixing the raw water with the biologically treated water in the ratio of 1:10, is 7 (mg/L). When the BOD of the raw water (treatment target raw water 1) is standard, that is, 150 (mg/L), the BOD of the biologically treated water (secondarily treated water) is 20 (mg/L) and the BOD of the inflowing water to the reaction tank, obtained by mixing the raw water with the biologically treated water in the ratio of 1:10, is 32 (mg/L). When the BOD of the raw water (treatment target raw water 1) is as high as 500 (mg/L), the BOD of the biologically treated water (the secondarily treated water in the biological treatment tank 3) is 150 (mg/L) and the BOD of the inflowing water to the reaction tank, obtained by mixing the raw water with the biologically treated water in the ratio of 1:10, is 182 (mg/L).

As shown in Table 3, provided that the tank residence time T is 0.25 (day) and the tank biomass X is 7,000 (mg/L), the BOD load C/TX is 0.004 when the inflowing BOD C of the inflowing water is 7 (mg/L), 0.02 when the inflowing BOD C of the inflowing water is 32 (mg/L), and 0.1 when the inflowing BOD C of the inflowing water is 182 (mg/L).

Accordingly, although the BOD load C/TX is 0.02 and the water quality is thus stable during a normal operation in which the inflowing BOD C is 32 (mg/L), a significant variation in the quality of the treatment target raw water 1 increases the BOD load C/TX to 0.1 to promote the proliferation of sludge. Microorganisms thus produce sub-metabolites (biopolymers) to make the filtration of the mixture in the tank unsuitable for membrane separation.

Thus, the control apparatus 18 controls the amount of aeration of the air diffuser 22 using as a control indicator at least one of the trans-membrane pressure acting on the membrane cartridge 21, the amount of loads flowing into the reaction tank 6, the level of the water in the reaction tank 6, and the amount of outflow of membrane permeation liquid.

The trans-membrane pressure is measured using the pressure gauge 17. The inflow amount of loads flowing into the reaction tank 6 refers to the amount of water flowing into the reaction tank 6 through the main channel 8, the primarily treated water supply line 9, and the mixture supply line 10. The inflow amount is measured using the flow meters 13, 14, 15. The level of the water in the reaction tank 6 is measured using the water gauge 12. The outflow amount of the membrane permeation liquid is measured using the flow meter 16.

Control method 1

The trans-membrane pressure is an indicator indirectly indicating the fouling state of the membrane surface in the membrane separation apparatus. An increase in trans-membrane pressure tends to clog the membrane surface. Thus, when the pressure gauge 17 shows an increase in trans-membrane pressure, the operation of the blower 24 is controlled to increase the amount of aeration of the air diffuser 22.

TABLE 4

| Trans-membrane pressure (kPa) | Aeration amount rate (%) |
|---|---|
| Minimum trans-membrane pressure | 100 |
| Minimum trans-membrane pressure + 5 kPa | 150 |
| Minimum trans-membrane pressure + 10 kPa | 200 |

For example, as shown in Table 4, it is assumed that the aeration amount corresponding to the minimum trans-membrane pressure preset to be a design value be 100%. If trans-membrane pressure increases by 5 kPa from the minimum value, an aeration amount is set to 150%. If trans-membrane pressure increases by 10 kPa from the minimum value, an aeration amount is set to 200%. Table 5 shows that the increase in aeration amount contributes to reducing the fouling state of the membrane surface.

TABLE 5

Aeration amount increase effect

| Instantaneous flux (m/d) | Aeration amount (L/min/sheet) | Trans-membrane pressure increase rate (kPa/d) |
|---|---|---|
| 2.2 | 12 | 0.6 |
| 2.2 | 16 | 0.12 |

Table 5 shows that, an increase in aeration amount reduced the trans-membrane pressure increase rate from 0.6 to 0.12 and that the instantaneous flux can be kept at 2.2.

Control method 2

Increased flux and the increased operation rate of the membrane separation apparatus cause the fouling of the membrane surface to progress faster. Thus, the amount of liquid having permeated the membrane cartridge 21 is measured using the flow meter 16. The amount of water flowing into the reaction tank 6 is measured using the flow meters 13, 14, 15. Alternatively, the level of the water in the reaction tank 6 is measured using the water gauge 12.

TABLE 6

| Instantaneous flux (m/d) | Inflow discharge amount (m³/min) | Water level in reaction tank (m) | Aeration amount rate (%) |
|---|---|---|---|
| Design flux | Design flow rate × 1 | Reference water level | 100 |
| Design flux × 2 | Design flow rate × 2 | Reference water level + 0.5 m | 150 |
| Design flux × 2.5 | Design flow rate × 2.5 | Reference water level + 1.0 m | 200 |

Table 6 shows flux as the instantaneous flux and the amount of water flowing into the reaction tank 6 as the inflow discharge amount. As shown in Table 6, it is assumed that the aeration amount corresponding to the design flux, the design flow rate, and the reference water level in the reaction tank, which are preset as design values, is 100%. When the inflow discharge amount (the inflowing water amount measured using the flow meters 13, 14, 15) doubles the design flow rate, the operation of the suction pump 26 is controlled so as to double the instantaneous flux and the operation of the blower 24 is controlled so as to set the aeration amount to be 150%.

When the inflow discharge amount (the inflowing water amount measured using the flow meters 13, 14, 15) is 2.5 times as large as the design flow rate, the operation of the suction pump 26 is controlled so as to increase the instantaneous flux by a factor of 2.5 and the operation of the blower 24 is controlled so as to set the aeration amount to be 200%.

An increase or decrease in inflow discharge amount can be sensed on the basis of the level of the water in the reaction tank 6. Thus, when the water level measured using the water gauge 12 is 0.5 m higher than the reference water level, the operation of the suction pump 26 is controlled so as to double the instantaneous flux and the operation of the blower 24 is controlled so as to set the aeration amount to be 150%.

When the water level measured using the water gauge 12 is 1.0 m higher than the reference water level, the operation of the suction pump 26 is controlled so as to increase the instantaneous flux by a factor of 2.5 and the operation of the blower 24 is controlled so as to set the aeration amount to be 200%.

The aeration amount can also be controlled by a combination of the trans-membrane pressure measured using the pressure gauge 17, the inflow amount measured using the flow meters 13, 14, 15, and the water level measured using the water gauge 12.

The invention claimed is:

1. A water treatment system in which raw water to be treated flowing into the system is subjected to a biological treatment process and then flows into a reaction tank for a membrane separation process and in which in the membrane separation process, a flocculation agent is used together to carry out a membrane separation treatment, the system comprising a raw water supply unit that supplies the treatment target raw water to the reaction tank and a flocculation agent addition unit that adds the flocculation agent to the reaction tank.

2. A water treatment system in which raw water to be treated flowing into the system is sequentially subjected to a pretreatment process and a biological treatment process and then flows into a reaction tank for a membrane separation process and in which in the membrane separation process, a flocculation agent is used together to carry out a membrane separation treatment, the system comprising a treated water supply unit that supplies the treated water from the pretreatment process to the reaction tank and a flocculation agent addition unit that adds the flocculation agent to the reaction tank.

3. The water treatment system according to claim 2, wherein the pretreatment process comprises a solid-liquid separation treatment process or a dissolution treatment process.

4. The water treatment system according to claim 1, wherein the system has, between the biological treatment process and the membrane separation process, a precipitation treatment unit that carries out a precipitation treatment on outflowing water from a biological treatment tank constituting the biological treatment process and supplies separated water to the reaction tank for the membrane separation process, and a mixture supply unit that supplies the outflowing water from the biological treatment tank to the reaction tank for the membrane separation process without passing the outflowing water through the precipitation treatment unit.

5. The water treatment system according to claim 2, wherein the system has, between the biological treatment process and the membrane separation process, a precipitation treatment unit that carries out a precipitation treatment on outflowing water from a biological treatment tank constituting the biological treatment process and supplies separated water to the reaction tank for the membrane separation process, and a mixture supply unit that supplies the outflowing water from the biological treatment tank to the reaction tank for the membrane separation process without passing the outflowing water through the precipitation treatment unit.

6. The water treatment system according to claim 1, comprising a submerged membrane separation apparatus in the reaction tank for the membrane separation process, the submerged membrane separation apparatus comprising a membrane separation unit, an air diffuser located below the membrane separation unit, and a control unit that controls the amount of aeration in the air diffuser, the control unit controlling the amount of aeration in the air diffuser using as a control indicator at least one of a trans-membrane pressure in the membrane separation unit, the amount of load flowing into the reaction tank, the level of the water in the reaction tank, and the amount of membrane permeation liquid flowing out through the membrane separation unit.

7. The water treatment system according to claim 2, comprising a submerged membrane separation apparatus in the reaction tank for the membrane separation process, the submerged membrane separation apparatus comprising a membrane separation unit, an air diffuser located below the membrane separation unit, and a control unit that controls the amount of aeration in the air diffuser, the control unit controlling the amount of aeration in the air diffuser using as a control indicator at least one of a trans-membrane pressure in the membrane separation unit, the amount of load flowing into the reaction tank, the level of the water in the reaction tank, and the amount of membrane permeation liquid flowing out through the membrane separation unit.

* * * * *